United States Patent [19]

Speikamp et al.

[11] Patent Number: 5,189,069
[45] Date of Patent: Feb. 23, 1993

[54] PROCESS FOR CONTROLLING THE PARTICLE SIZE IN THE PREPARATION OF EXPANDABLE STYRENE POLYMERS BY SUSPENSION POLYMERIZATION

[75] Inventors: Hans-Dieter Speikamp, Haltern; Adolf Kühnle; Jürgen Bretschneider, both of Marl, all of Fed. Rep. of Germany

[73] Assignee: Huels Aktiengesellschaft, Marl, Fed. Rep. of Germany

[21] Appl. No.: 726,288

[22] Filed: Jul. 5, 1991

[30] Foreign Application Priority Data

Sep. 15, 1990 [DE] Fed. Rep. of Germany ....... 4029298

[51] Int. Cl.$^5$ .............................................. C08J 9/20
[52] U.S. Cl. .................... 521/56; 521/146; 521/147; 526/87
[58] Field of Search ................ 526/87; 521/56, 146, 521/147

[56] References Cited

U.S. PATENT DOCUMENTS

| | | | |
|---|---|---|---|
| 3,657,162 | 4/1972 | Finestone et al. | 521/56 |
| 4,137,388 | 1/1979 | Cutter | 526/228 X |
| 4,174,425 | 11/1979 | Saito et al. | 521/56 |
| 4,404,338 | 9/1983 | DeToffol et al. | 526/87 X |
| 4,489,058 | 12/1984 | Lay et al. | 424/78 |

FOREIGN PATENT DOCUMENTS

| | | | |
|---|---|---|---|
| 0214626 | 3/1987 | European Pat. Off. | |
| 2423849 | 12/1974 | Fed. Rep. of Germany. | |
| 2712609 | 9/1977 | Fed. Rep. of Germany. | |
| 2053306 | 3/1987 | Japan | 526/87 |
| 6405604 | 11/1964 | Netherlands | 521/146 |
| 1344060 | 1/1974 | United Kingdom | 526/200 |
| 2114580 | 8/1983 | United Kingdom. | |

*Primary Examiner*—Fred Teskin
*Attorney, Agent, or Firm*—Oblon, Spivak, McClelland, Maier & Neustadt

[57] ABSTRACT

Expandable styrene polymer of controlled particle size is prepared by polymerizing styrene and optionally polymerizable comonomers in a stirred aqueous suspension in the presence of monomer-soluble free radical initiator and dispersant to the extent that at least 70%, based on the total monomer, of the monomers are polymerized in the aqueous suspension initially to a conversion of at least 70% by weight; and then adding the remaining monomer, initiator and optional copolymerizable monomer and additives to the polymerization medium over one to three hours.

7 Claims, No Drawings

PROCESS FOR CONTROLLING THE PARTICLE SIZE IN THE PREPARATION OF EXPANDABLE STYRENE POLYMERS BY SUSPENSION POLYMERIZATION

BACKGROUND OF THE INVENTION

1. Field of the Invention

The present invention relates to a process of preparing expandable styrene polymer of controlled particle size.

2. Description of the Background

In the preparation of expandable polystyrene by aqueous suspension polymerization, a relatively broad particle size spectrum is obtained. About 90% of the particles are in the range between 0.5 and 2.0 mm, with a maximum between 0.7 and 1.0 mm.

Different particle fractions have different applications. Thus, fine material is employed in the packaging sector, while coarse material is used primarily in the building sector in the manufacture of insulation, footstep insulation and the like products.

Market requirements are constantly changing. It is therefore desirable to control the particle size distribution of expandable polystyrene during polymerization without endangering suspension stability. The only possibility known to date for control is the qualitative and quantitative variation of the suspending agent composition as described in German Offenlegungsschrift 331,569, German Offenlegungsschrift 331,570, JA 945 248 and German Offenlegungsschrift 3,728,044. Influencing the particle size distribution in a controlled manner during suspension polymerization of styrene is not possible in these processes; the amount of suspending agent must be redetermined for each subsequent batch. Establishing coarse particle sizes in a controlled manner leads again and again, in the critical polymerization range of 120 to 180 min, to instabilities, which are counteracted by premature restabilization. However, this generally results in increased internal water contents and a very broad particle size spectrum with the particulate material containing a large amount of fine material.

The reason for the occurrence of instabilities and poor reproducibility are likely attributable, inter alia, to the characteristics of the particle size development during the suspension polymerization. The initially very fine particles grow only insignificantly in the first 120 minutes of polymerization time. Thereafter, a drastic growth in particle size occurs within a short time of 120 to 180 min until the desired final particle size is reached at the settling point. At the settling point, the styrene conversion is about 70%. The viscosity of the particles at this point in time is so high that virtually no coalescence occurs and formation of further particles by subdivision take place. In other words, the particles retain their identity. Immediately before the settling point, the suspension is relatively unstable and the tendency to cream increases with decreasing amount of suspending agent. Furthermore, this course of particle size development results in poor reproducibility of the batches.

An alternative is seed polymerization. A completely polymerized particle of a defined size is taken and a certain amount of organic phase is metered and disclosed in European Patent 102,655; U.S. Pat. No. 1,54,184; French Patent 2,238,717; French Patent 2,238,718; German Offenlegungsschrift 2,338,133. This process makes it possible to influence the particle size during polymerization by means of the amount of organic phase metered in. However, seed polymerization requires the presence of a seed particle free of coating agent. This preparation necessitates a separate polymerization process and hence reduces the space/time yield. Homogeneous distribution of the subsequently delivered organic phase requires a very slow metering rate. Otherwise, undesirable formation of further particles, particularly as fine material occurs. A need therefore continues to exist for a styrene suspension polymerization process which provides greater control of polymer particle size distribution.

SUMMARY OF THE INVENTION

Accordingly, one object of the present invention is to provide a process for controlling the particle size during suspension polymerization which can be conducted in a stable manner in the critical range and by means of which a coarse final particle size can be achieved.

Briefly, this object and other objects of the present invention as hereinafter will become more readily apparent can be attained by a process for preparing expandable polystyrene of controlled particle size by polymerizing styrene and optionally polymerizable comonomers in a stirred aqueous suspension in the presence of monomer-soluble free radical initiator and dispersant to the extent that at least 70%, based on the total monomer, of the monomers are polymerized in the aqueous suspension initially to a conversion of at least 70% by weight, and then adding the remaining monomer, initiator and optional copolymerizable monomer and additives to the polymerization medium over one to three hours.

DETAILED DESCRIPTION OF THE PREFERRED EMBODIMENTS

It has now been surprisingly found that by the process of the invention the particle size distribution of the polymer particles is no longer controlled by the amount of suspending agent. Instead, a fine and hence stable particle size is established, at a high level of suspending agent by the settling point of the particles at 70% styrene conversion at about 180 min reaction time. The suspensions formulation is identical to the standard formulation for styrene polymerization normally employed. The particle development takes place relatively slowly up to the settling point and there is no dramatic particle growth. If the mixture were allowed to continue polymerizing as normally done with standard formulations, an undesirable very fine polymer particle size would be obtained. The desired final particle size is established by subsequent metering in of further organic phases. The in-flowing organic phase diffuses into the stable polymer particles already present. This leads to continuous increase in particle size. Formation of further particles is undesirable because they lead to an increase in the fine particle fraction of the particulate product. The metering rate should therefore be chosen so that, as far as possible, no free styrene droplets are present in the suspension. A further criterion determining rate of metering in of organic phase is the settling point of the particles. The residual styrene content should always be $\leq 30\%$ by weight. In this way, the particles retain their identity and the suspension cannot become unstable.

Upon the conclusion of the metering of organic phase, the suspension polymerization is continued in the conventional manner. The normal polymerization cycle is interrupted virtually only when organic phase is metered in. The associated increase in the cycle time is, however, largely compensated by the increase in the ratio of organic phase to aqueous phase and hence in the yield.

U.S. Pat. No. 4,137,388, JP 62 053 306 and JP 5393/6 disclose the subsequent metering in of organic phase. However, this measure has served only to improve the processing properties, i.e., the effect on the molecular weight distribution or to improve the optical properties of the product. In contrast to the present process, in the publications cited above, metering in is not carried out at a certain metering rate which keeps the residual styrene content constant. This makes control of particle size impossible.

In the process according to the present invention, 70 to 90%, preferably 80 to 90%, of the amount of styrene to be polymerized and optionally comonomers, in which one or more water-insoluble initiators are dissolved, are dispersed in about the same amount of water while stirring. The amount and type of polymerization initiators are matched with the polymerization temperature in such a way that the final conversion is as complete as possible and the molecular weight of the polymer has the desired values. For stabilization of the dispersed particles, organic or inorganic dispersants are added to the reaction mixture. This mixture is heated to the polymerization temperature at about 90° C. and then styrene is polymerized to a conversion level of 70% in about 180 min reaction time, generally in the range from 120 to 210 minutes. Thereafter, the residual styrene which is about 10 to 30% of the total amount of styrene employed, which contains initiator and dispersant, is metered into the reaction mixture over the course of 1 to 3 hours, preferably 1 to 2 hours. The metering rate should be chosen so that the residual monomer content is always less than or equal to 30% by weight.

After subsequent metering of the organic phase, the mixture is polymerized to completion.

Metering in of a 20% strength by weight organic phase over the course of 2 hours after a reaction time of 180 min has proved optimum with regard to the target objective of an increase in particle size.

For the preparation of the expandable styrene polymers the monomer employed is styrene or a monomer mixture containing at least 50% by weight of styrene. Examples of suitable comonomers include α-methylstyrene, styrenes halogenated in the nucleus, acrylonitrile, esters of acrylic and methacrylic acid with alcohols having 1 to 8 carbon atoms and N-vinyl compounds such as N-vinylcarbazole.

The suspension polymerization is carried out at temperatures of 80° to 130° C. It is initiated in a conventional manner using one or more free radical-forming substances, examples being tert-butyl benzoate, tert-butyl peroctoate, di-tert-butyl peroxide, dibenzoyl peroxide and mixtures thereof. Organic protective colloids such as polyvinyl alcohol, polyvinylpyrrolidone, polyvinylpyrrolidone copolymers and hydroxyalkylcelluloses, or mineral suspending agents, such as finely divided tricalcium phosphate and barium phosphate, or mixtures of organic protective colloids and mineral suspending agents may be used in a known manner as suspension stabilizers.

The blowing agent for the polymer beads can be added during or after polymerization, depending on the process. However, addition of blowing agent is not possible before the end of metering in of organic phase.

The blowing agents used are the known low-boiling, merely swelling, liquid hydrocarbons such as pentane or hexane, cycloaliphatic hydrocarbons such as cyclohexane, and halohydrocarbons such as dichlorodifluoromethane or 1,2,2-trifluoro-1,1,2-trichloroethane, and mixtures of these compounds. The amount of blowing agent employed ranges from 3 15% by weight, preferably between 5 and 8% by weight, based on the styrene polymer.

The expandable styrene polymers may contain the conventional flameproofing agents such as organic halogen compounds, in particular bromine compounds. These include particularly completely or partially brominated oligomers of butadiene or of isoprene having a mean degree of polymerization of 2 to 20, for example 1,2,5,6- tetrabromocyclooctane, 1,2,5,6,9,10-hexabromocyclodecane or brominated polybutadiene having a degree of polymerization of, for example, 3 to 15. The organic halogen compounds are present in the expandable styrene polymer in amounts of 0.4 to 3% by weight. In addition to the flame-retardant halogen compounds, it is possible to use the known synergistic agents in conventional amounts, preferably organic peroxides, in particular those having a half life of at least two hours at 373°K. If desired, the halogen compounds can also be used in a known manner in amounts of 0.05 to 1% by weight in order to improve the minimum residence time.

The expandable styrene polymers may furthermore contain additives, such as dyes, fillers and stabilizers. After their preparation, they are present in bead form and have a particle diameter of between 0.5 and 2.0 mm.

Styrene polymers are further expanded by conventional methods, in the pre-expanded state, by heating in molds which are not gas-tight, and are sintered to give foamed articles which correspond in their dimensions to the inner cavity of the molds used.

Having now generally described this invention, a further understanding can be obtained by reference to certain specific examples which are provided herein for purposes of illustration only and ar not intended to be limiting unless otherwise specified.

EXAMPLE 1

50 kg of water together with 76.4 g of hydroxyethylcellulose, 191 g of tricalcium phosphate and 5.1 g of EDTA as a suspending medium are introduced into a 150 1 reactor. 50 kg of styrene which contains 203.6 g of benzoyl peroxide and 127.3 g of tert-butyl perbenzoate are added. The mixture is heated to 90° C. while stirring and is kept at this temperature for 3 hours. Thereafter, a further 10.2 kg of styrene which contains 40.8 g of benzoyl peroxide and 25.5 g of tert-butyl perbenzoate are metered in within 2 hours. After the end of the metering in of organic phase, stabilization is subsequently effected with 25.5 g of polyvinyl alcohol.

A total of 3.7 kg of pentane is then added over the course of 1 hour while simultaneously heating the mixture to 110° C. After a polymerization time of a further 5 hours, the suspension is discharged and the polymer is filtered off, dried and sieved.

| | |
|---|---|
| Yield: | 65.0 kg |
| K value: | 56.8 |
| Monomeric styrene: | 0.12% by weight |
| Blowing agent content: | 6.68% by weight |
| Water content: | 0.08% by weight |
| Particle size distribution: | |

| >2.5 mm | >2.0 mm | >1.6 mm | >1.25 mm | >1.0 mm | >0.9 mm | >0.8 mm | >0.63 mm | >0.5 mm |
|---|---|---|---|---|---|---|---|---|
| 3.1% | 13.0% | 22.1% | 36.8% | 11.0% | 6.9% | 2.2% | 3.6% | 0.8% |

| Fine material: | 0.5% |
|---|---|

EXAMPLE 2

The reaction conditions and reaction temperature are as described in Example 1, except that 0.1% of polyvinyl alcohol is used instead of the hydroxyethylcellulose and the tricalcium phosphate.

| Yield: | 65.0 kg |
|---|---|
| K value: | 56.3 |
| Monomeric styrene: | 0.10% by weight |
| Blowing agent content: | 6.42% by weight |
| Water content: | 0.24% by weight |
| Particle size distribution: | |

| >2.5 mm | >2.0 mm | >1.6 mm | >1.25 mm | >1.0 mm | >0.9 mm | >0.8 mm | >0.63 mm | >0.5 mm |
|---|---|---|---|---|---|---|---|---|
| 5.1% | 13.5% | 20.2% | 35.6% | 14.8% | 9.6% | 0.6% | 0.4% | 0.4% |

| Fine material: | 0.2% |
|---|---|

COMPARATIVE EXAMPLE 1

The reaction conditions and the reaction temperatures are as described in Example 1, except that there is no subsequent metering of some of the organic phase.

| Yield: | 55 kg |
|---|---|
| K value: | 54.0 |
| Monomeric styrene: | 0.29% by weight |
| Blowing agent content: | 6.16% by weight |
| Water content: | 0.11% by weight |
| Particle size distribution: | |

| >2.5 mm | >2.0 mm | >1.6 mm | >1.25 mm | >1.0 mm | >0.9 mm | >0.8 mm | >0.63 mm | >0.5 mm |
|---|---|---|---|---|---|---|---|---|
| 2.6% | 3.2% | 3.2% | 8.7% | 11.3% | 17.8% | 13.5% | 28.4% | 8.4% |

| Fine material: | 2.9% |
|---|---|

Having now fully described the invention, it will be apparent to one of ordinary skill in the art that many changes and modifications can be made thereto without departing from the spirit or scope of the invention as set forth herein.

We claim:

1. A process for the preparation of expandable styrene polymer comprising polymerizing styrene and optionally polymerizable comonomers in a stirred aqueous suspension in the presence of a water-soluble free radical initiator and dispersant to the extent that at least 70%, based on the total monomer, of the monomers are polymerized in the aqueous suspension initially to a conversion of at least 70% by weight; and then adding the remaining monomer, initiator and optional copolymerizable monomer and additives to the polymerization medium over one to three hours;

wherein the metering rate of monomer is chosen so that the remaining monomer content is always less than or equal to 30% by weight.

2. The process according to claim 1, wherein the initially introduced monomer is polymerized for 120 to 210 minutes to the settling point and then the remaining monomer is metered into the polymerization medium.

3. The process according to claim 1, wherein the amount of remaining monomer metered in is 10 to 20% by weight, based on the total amount of monomer.

4. The process according to claim 1, wherein from 70% to 90% of styrene monomer and optional copolymerizable monomer are initially polymerized.

5. The process according to claim 1, wherein the polymerization is conducted at a temperature of about 80° to 130° C.

6. The process according to claim 1, wherein a mixture of styrene and comonomer containing at least 50% by weight styrene is employed.

7. The process according to claim 1, wherein a blowing agent in an amount of from 3 to 15% by weight is added to the polymerization medium.

* * * * *